United States Patent
Fang et al.

(10) Patent No.: US 11,079,808 B2
(45) Date of Patent: Aug. 3, 2021

(54) DUAL-AXIS HINGE ASSEMBLY AND ELECTRONIC DEVICE

(71) Applicants: Hsin-Chieh Fang, Taipei (TW); Wang-Hung Yeh, Taipei (TW); Shu-Hung Lin, Taipei (TW); Chun-Wen Wang, Taipei (TW)

(72) Inventors: Hsin-Chieh Fang, Taipei (TW); Wang-Hung Yeh, Taipei (TW); Shu-Hung Lin, Taipei (TW); Chun-Wen Wang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/120,459

(22) Filed: Sep. 4, 2018

(65) Prior Publication Data

US 2019/0086970 A1    Mar. 21, 2019

Related U.S. Application Data (60) Provisional application No. 62/610,278, filed on Dec. 26, 2017, provisional application No. 62/558,879, filed on Sep. 15, 2017.

(51) Int. Cl.
*E05D 3/12* (2006.01)
*E05D 11/00* (2006.01)
*G06F 1/16* (2006.01)

(52) U.S. Cl.
CPC .......... *G06F 1/1681* (2013.01); *G06F 1/1616* (2013.01); *G06F 1/1618* (2013.01); *E05D 3/12* (2013.01); *E05D 11/0054* (2013.01)

(58) Field of Classification Search
CPC ........ G06F 1/1683; G06F 1/16; G06F 1/1616; G06F 1/1681; G06F 11/1681;

(Continued)

(56) References Cited

U.S. PATENT DOCUMENTS

| | | | | |
|---|---|---|---|---|
| 1,199,409 A | * | 9/1916 | Neuberth | E05D 11/0054 16/250 |
| 2,047,909 A | * | 7/1936 | North | E05D 3/02 16/250 |

(Continued)

FOREIGN PATENT DOCUMENTS

| | | | | |
|---|---|---|---|---|
| CN | 106527588 | * | 3/2017 | G06F 1/16 |
| TW | I557333 | | 11/2016 | |
| TW | M537242 | | 2/2017 | |

OTHER PUBLICATIONS

Machine English translation of CN 106527588 Lenovo. (Year: 2017).*

(Continued)

*Primary Examiner* — Emily M Morgan
(74) *Attorney, Agent, or Firm* — JCIPRNET (57) ABSTRACT

A dual-axis hinge assembly including a first rotating shaft, a second rotating shaft, torque components, a rotating shaft sleeve, a first bracket, a second bracket, and two bracket sleeves is provided. The second rotating shaft is disposed side-by-side to the first rotating shaft. The torque components are disposed at the first rotating shaft and the second rotating shaft. The rotating shaft sleeve covers the first rotating shaft, the second rotating shaft, and the torque components. The first bracket is connected to the first rotating shaft. The second bracket is connected to the second rotating shaft. The two bracket sleeves are respectively coaxial with the first rotating shaft and the second rotating shaft and respectively cover the first bracket and the second bracket. The two bracket sleeves and the rotating shaft sleeve are sleeved together. The invention further provides a plurality of electronic devices.

11 Claims, 9 Drawing Sheets

(58) Field of Classification Search
CPC ....... G06F 11/1683; E05D 3/122; E05D 5/10;
E05D 2005/106; E05D 5/16; E05D
2011/0072; E05D 11/0054; E05D
11/0081; E05D 3/06; E05D 3/12
USPC .................. 361/379.21, 679.28; 16/250, 251
See application file for complete search history.

(56) References Cited

U.S. PATENT DOCUMENTS

| | | | | |
|---|---|---|---|---|
| 4,802,259 | A * | 2/1989 | Geslewitz | E05D 11/0054 16/251 |
| 5,224,240 | A * | 7/1993 | Smith | E05D 11/0054 16/251 |
| 5,278,725 | A * | 1/1994 | Konno | G06F 1/1616 16/223 |
| 5,390,075 | A * | 2/1995 | English | G06F 1/1616 16/386 |
| 5,490,306 | A * | 2/1996 | Floyd | E05D 11/0054 16/250 |
| 6,223,393 | B1 * | 5/2001 | Knopf | G06F 1/1618 16/366 |
| 9,411,365 | B1 * | 8/2016 | Tanner | G06F 1/1618 |
| 9,534,432 | B2 * | 1/2017 | Lee | E05D 3/18 |
| 9,836,093 | B2 * | 12/2017 | Chen | G06F 1/1681 |
| 10,088,875 | B1 * | 10/2018 | Lin | E05D 7/00 |
| 10,480,226 | B1 * | 11/2019 | Chen | E05D 3/122 |
| 10,747,271 | B2 * | 8/2020 | Lin | G06F 1/1681 |
| 2002/0069483 | A1 * | 6/2002 | Savolainen | G06F 1/1616 16/308 |
| 2002/0129464 | A1 * | 9/2002 | Davis | E05D 11/0054 16/250 |
| 2004/0264118 | A1 * | 12/2004 | Karidis | G06F 1/1616 361/679.55 |
| 2005/0081333 | A1 * | 4/2005 | Emerson | E05D 11/0054 16/250 |
| 2006/0238968 | A1 * | 10/2006 | Maatta | H04M 1/0218 361/679.01 |
| 2006/0238970 | A1 * | 10/2006 | Ukonaho | H04M 1/022 361/679.01 |
| 2006/0256516 | A1 * | 11/2006 | Cho | G06F 1/1616 361/679.29 |
| 2006/0286836 | A1 * | 12/2006 | Ku | H04M 1/0208 439/165 |
| 2007/0151381 | A1 * | 7/2007 | Pelkonen | G06F 1/1616 74/437 |
| 2008/0307608 | A1 * | 12/2008 | Goto | G06F 1/1618 16/366 |
| 2010/0205777 | A1 * | 8/2010 | Kim | E05D 11/0081 16/386 |
| 2011/0310540 | A1 * | 12/2011 | Hashimoto | G06F 1/1683 361/679.01 |
| 2012/0186041 | A1 * | 7/2012 | Stots | E05D 11/1007 16/250 |
| 2013/0070406 | A1 * | 3/2013 | Ashcraft | G06F 1/1681 361/679.21 |
| 2013/0322004 | A1 * | 12/2013 | Park | F16C 11/04 361/679.27 |
| 2015/0245510 | A1 * | 8/2015 | Hsu | H05K 5/0226 16/250 |
| 2016/0004366 | A1 * | 1/2016 | Chen | G06F 1/1681 345/173 |
| 2016/0011632 | A1 * | 1/2016 | Hsu | E05D 3/122 16/354 |
| 2016/0326786 | A1 * | 11/2016 | Lee | E05D 5/10 |
| 2017/0097657 | A1 * | 4/2017 | Hampton | G06F 1/1681 |
| 2018/0032110 | A1 * | 2/2018 | Hsu | E05D 3/122 |
| 2018/0035565 | A1 * | 2/2018 | Hsu | E05D 3/06 |
| 2018/0309861 | A1 * | 10/2018 | Lin | G06F 1/1681 |
| 2019/0155344 | A1 * | 5/2019 | Lin | E05D 3/12 |
| 2019/0250676 | A1 * | 8/2019 | Lin | G06F 1/1681 |
| 2019/0317560 | A1 * | 10/2019 | Lin | E05D 11/082 |
| 2019/0383073 | A1 * | 12/2019 | Zhu | G06F 1/1683 |

OTHER PUBLICATIONS

"Office Action of Taiwan Counterpart Application", dated Jul. 9, 2019, pp. 1-4.
"Office Action of China Counterpart Application," dated Dec. 30, 2019, p. 1-p. 14.

* cited by examiner

DUAL-AXIS HINGE ASSEMBLY AND ELECTRONIC DEVICE

CROSS-REFERENCE TO RELATED APPLICATION

This application claims the priority benefits of U.S. provisional application Ser. No. 62/558,879, filed on Sep. 15, 2017, and U.S. provisional application Ser. No. 62/610,278, filed on Dec. 26, 2017. The entirety of each of the above-mentioned patent applications is hereby incorporated by reference herein and made a part of specification.

BACKGROUND OF THE INVENTION

Field of the Invention

The invention relates to a hinge assembly and an electronic device, and more particularly, to a dual-axis hinge assembly and an electronic device.

Description of Related Art

With the rapid development of technology, portable electronic devices with dual bodies such as notebook computers are quite common. Users may process, send and receive data anytime, anywhere through these portable electronic devices, which have become indispensable items for modern people in their lives. Taking a notebook computer as an example, a relative pivoting effect is achieved between the two bodies via a hinge structure. As the usage requirements become more diverse, a hinge structure that allows the two bodies to relatively rotate at 360 degrees has become the focus of current research.

SUMMARY OF THE INVENTION

The invention provides a dual-axis hinge assembly that provides a rotational angle of 0 degrees to 360 degrees.

The invention provides an electronic device having the dual-axis hinge assembly.

A dual-axis hinge assembly of the invention is adapted to pivot a first body to a second body, wherein the dual-axis hinge assembly is partially exposed from the first body and the second body, and the exposed portion forms two cylindrical structures side by side. The dual-axis hinge assembly includes a first rotating shaft, a second rotating shaft, torque components, a rotating shaft sleeve, a first bracket, a second bracket, and two bracket sleeves. The second rotating shaft is disposed side-by-side to the first rotating shaft. The torque components are disposed at the first rotating shaft and the second rotating shaft. The rotating shaft sleeve covers the first rotating shaft, the second rotating shaft, and the torque components. The first bracket is fixed to the first rotating shaft and is suitable to be connected to the first body. The second bracket is connected to the second rotating shaft and adapted to be fixed to the second body. The two bracket sleeves are respectively coaxial with the first rotating shaft and the second rotating shaft and respectively cover the first bracket and the second bracket. The two cable sleeves are respectively coaxial with the first rotating shaft and the second rotating shaft, wherein the two bracket sleeves and the rotating shaft sleeve are sleeved together.

In an embodiment of the invention, the dual-axis hinge assembly further includes a cable connected to the first body and the second body; and two cable sleeves respectively coaxial with the first rotating shaft and the second rotating shaft, wherein the two cable sleeves communicate with each other and adapted to allow the cable connected to the first body and the second body to pass through, wherein the two bracket sleeves, the rotating shaft sleeve, and the two cable sleeves are sleeved together.

In an embodiment of the invention, the dual-axis hinge assembly further includes a first rod and a second rod. The first rod is coaxial with the first rotating shaft. The second rod is coaxial with the second rotating shaft, wherein the first rod and the second rod are respectively sleeved on the two bracket sleeves or respectively sleeved on the two cable sleeves.

In an embodiment of the invention, the first rod is sequentially sleeved together with one of the bracket sleeves, the rotating shaft sleeve, and one of the cable sleeves, and the second rod is sequentially sleeved together with the other of the bracket sleeves, the rotating shaft sleeve, and the other of the cable sleeves.

In an embodiment of the invention, the first rod is integral with one of the bracket sleeves, and the second rod is integral with the other of the bracket sleeves.

In an embodiment of the invention, the first rod is sequentially sleeved together with one of the cable sleeves, the rotating shaft sleeve, and one of the bracket sleeves, and the second rod is sequentially sleeved together with the other of the cable sleeves, the rotating shaft sleeve, and the other of the bracket sleeves.

In an embodiment of the invention, the first rod is integral with one of the cable sleeves, and the second rod is integral with the other of the cable sleeves.

In an embodiment of the invention, the dual-axis hinge assembly further includes a first connecting portion and a second connecting portion. The first connecting portion is extended from the first rod and adapted to be fixed to the first body. The second connecting portion is extended from the second rod and adapted to be fixed to the second body.

An electronic device of the invention includes a first body, a second body, and a dual-axis hinge assembly. The dual-axis hinge assembly is connected to and exposed from the first body and the second body. The exposed portion of the dual-axis hinge assembly forms two cylindrical structures side by side. The dual-axis hinge assembly includes a first rotating shaft, a second rotating shaft, torque components, a rotating shaft sleeve, a first bracket, a second bracket, and two bracket sleeves. The second rotating shaft is disposed side-by-side to the first rotating shaft. The torque components are disposed at the first rotating shaft and the second rotating shaft. The rotating shaft sleeve covers the first rotating shaft, the second rotating shaft, and the torque components. The first bracket is connected to the first rotating shaft and fixed to the first body. The second bracket is connected to the second rotating shaft and fixed to the second body. The two bracket sleeves are respectively coaxial with the first rotating shaft and the second rotating shaft and respectively cover the first bracket and the second bracket. The two bracket sleeves and the rotating shaft sleeves are sleeved together.

In an embodiment of the invention, the dual-axis hinge assembly further includes a cable connected to the first body and the second body; and two cable sleeves respectively coaxial with the first rotating shaft and the second rotating shaft, wherein the two cable sleeves communicate with each other and adapted to allow the cable connected to the first body and the second body to pass through, wherein the two bracket sleeves, the rotating shaft sleeve, and the two cable sleeves are sleeved together.

In an embodiment of the invention, the dual-axis hinge assembly further includes a first rod and a second rod. The first rod is coaxial with the first rotating shaft. The second rod is coaxial with the second rotating shaft, wherein the first rod and the second rod are respectively sleeved on the two bracket sleeves or respectively sleeved on the two cable sleeves and exposed from the first body and the second body.

In an embodiment of the invention, the first rotating shaft and the second rotating shaft, the torque components, the rotating shaft sleeve, at least a portion of each of the bracket sleeves, at least a portion of each of the cable sleeves, and the first rod and the second rod are located outside the first body and the second body and together form two cylindrical structures side by side.

In an embodiment of the invention, the first rod is sequentially sleeved together with one of the bracket sleeves, the rotating shaft sleeve, and one of the cable sleeves, and the second rod is sequentially sleeved together with the other of the bracket sleeves, the rotating shaft sleeve, and the other of the cable sleeves.

In an embodiment of the invention, the first rod is integral with one of the bracket sleeves, and the second rod is integral with the other of the bracket sleeves.

In an embodiment of the invention, the first rod is sequentially sleeved together with one of the cable sleeves, the rotating shaft sleeve, and one of the bracket sleeves, and the second rod is sequentially sleeved together with the other of the cable sleeves, the rotating shaft sleeve, and the other of the bracket sleeves.

In an embodiment of the invention, the first rod is integral with one of the cable sleeves, and the second rod is integral with the other of the cable sleeves.

In an embodiment of the invention, the dual-axis hinge assembly further includes a first connecting portion and a second connecting portion. The first connecting portion is extended from the first rod and fixed to the first body. The second connecting portion is extended from the second rod and fixed to the second body.

In an embodiment of the invention, the dual-axis hinge assembly forms two cylindrical structures side by side at a portion exposed from the first body and the second body, and a length of each of the cylindrical structures is the same length as a length of the first body.

An electronic device of the invention includes a first body, a second body, and a dual-axis hinge assembly. The dual-axis hinge assembly is disposed at the first body and the second body, wherein the first body is pivoted to the second body, and the dual-axis hinge assembly is exposed from the first body and the second body to form two cylindrical structures side by side, and a length of each of the cylindrical structures is the same as a length of the first body.

In an embodiment of the invention, the electronic device further includes a cable connected to the first body and the second body. The dual-axis hinge assembly includes a first rotating shaft, a second rotating shaft, torque components, a rotating shaft sleeve, a first bracket, a second bracket, two bracket sleeves, and two cable sleeves. The second rotating shaft is disposed side-by-side to the first rotating shaft. The torque components are sleeved on the first rotating shaft and the second rotating shaft. The rotating shaft sleeve covers the first rotating shaft, the second rotating shaft, and the torque components. The first bracket is fixed to the first rotating shaft and fixed to the first body. The second bracket is fixed to the second rotating shaft and fixed to the second body. The two bracket sleeves are respectively coaxial with the first rotating shaft and the second rotating shaft and respectively cover the first bracket and the second bracket. The two cable sleeves are respectively coaxial with the first rotating shaft and the second rotating shaft, wherein the two cable sleeves communicate with each other, and the cable passes through the two cable sleeves, wherein the two bracket sleeves, the rotating shaft sleeve, and the two cable sleeves are sleeved together.

In an embodiment of the invention, the dual-axis hinge assembly further includes a first rod and a second rod. The first rod is coaxial with the first rotating shaft. The second rod is coaxial with the second rotating shaft, wherein the first rod and the second rod are respectively sleeved on the two bracket sleeves or respectively sleeved on the two cable sleeves and exposed from the first body and the second body.

In an embodiment of the invention, the dual-axis hinge assembly further includes a first connecting portion and a second connecting portion. The first connecting portion is extended from the first rod and fixed to the first body. The second connecting portion is extended from the second rod and fixed to the second body.

Based on the above, the dual-axis hinge assembly of the invention is adapted to pivot the first body 360 degrees to the second body. In addition, the two bracket sleeves, the rotating shaft sleeve, and the two cable sleeves of the dual-axis hinge assembly of the invention are sleeved together to exhibit a more complete appearance. The dual-axis hinge assembly used in the electronic device of the invention is located outside the first body and the second body, the first body and the second body may maintain a complete appearance, and the dual-axis hinge assembly forms two cylindrical structures side by side, thereby providing a unique appearance.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
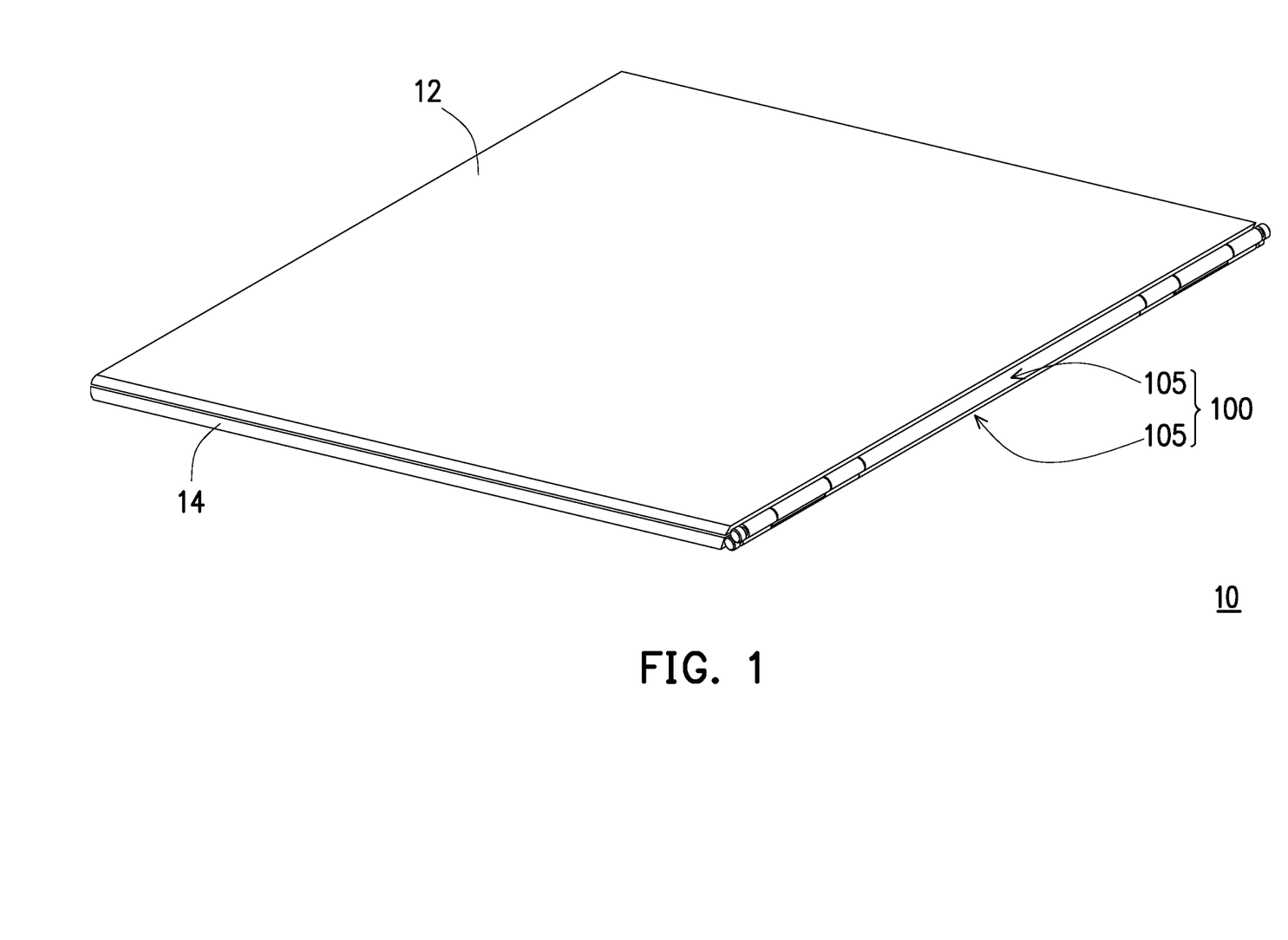
FIG. 1 is a schematic of an electronic device according to an embodiment of the invention.

FIG. 1 is a schematic of an electronic device according to an embodiment of the invention. Referring to FIG. 1, an electronic device 10 of the present embodiment includes a first body 12, a second body 14, and a dual-axis hinge assembly 100. In the present embodiment, the first body 12 is pivoted to the second body 14 via the dual-axis hinge assembly 100 so as to be rotated 360 degrees with respect to the second body 14. The electronic device 10 of the present embodiment is exemplified by a notebook computer. The first body 12 includes, for example, a display or a touch screen. The second body 14 includes, for example, a keyboard module or a touchpad operating region, but the type of the electronic device 10, the first body 12, and the second body 14 is not limited thereto.

In comparison to a known electronic device, the appearance of the first body or the second body is damaged by forming a depression at a portion on the first body or the second body corresponding to a hinge. In the electronic device 10 of the present embodiment, the dual-axis hinge assembly 100 is moved outside the first body and the second body 14, and the first body 12 and the second body 14 may have a complete appearance. As may be seen from FIG. 1, in the present embodiment, the appearance of the first body 12 and the second body 14 at a portion close to the dual-axis hinge assembly 100 is intact.

In addition, in the present embodiment, the dual-axis hinge assembly 100 is exposed from the first body 12 and the second body 14, and the dual-axis hinge assembly 100 forms two cylindrical structures 105 side by side at a portion exposed from the first body 12 and the second body 14. Therefore, the electronic device 10 has a unique appearance. In the present embodiment, the length of each of the cylindrical structures 105 of the dual-axis hinge assembly 100 is the same as the length of the first body 12 or/and the second body 14, such that the appearance is quite visually coordinated. Of course, in other embodiments, the length of the cylindrical structures 105 may also be slightly less than the length of the first body 12 or/and the second body 14, and the length relationship is not limited thereto.

Figure 2:
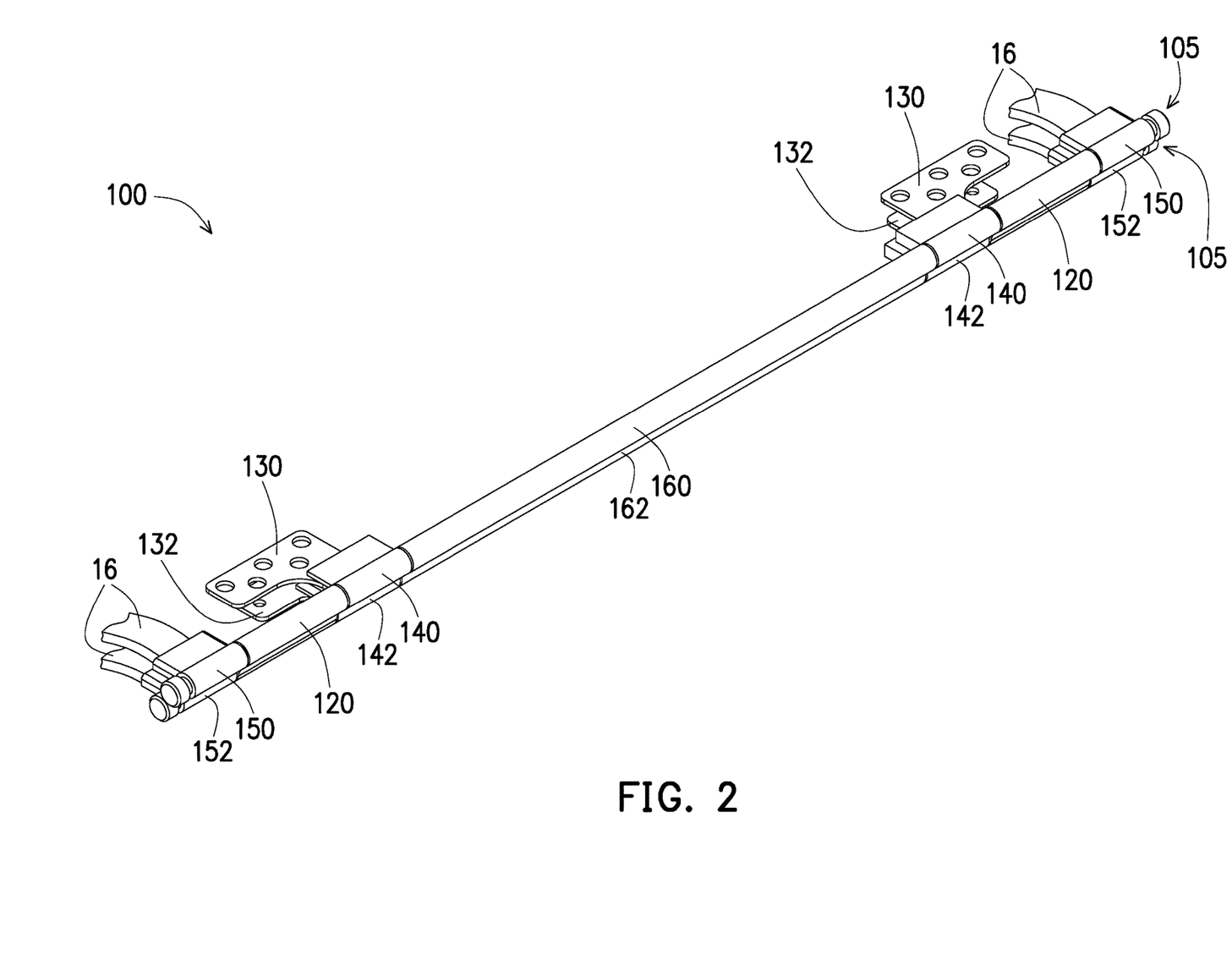
FIG. 2 is a schematic of a dual-axis hinge assembly according to an embodiment of the invention.
Figure 3:
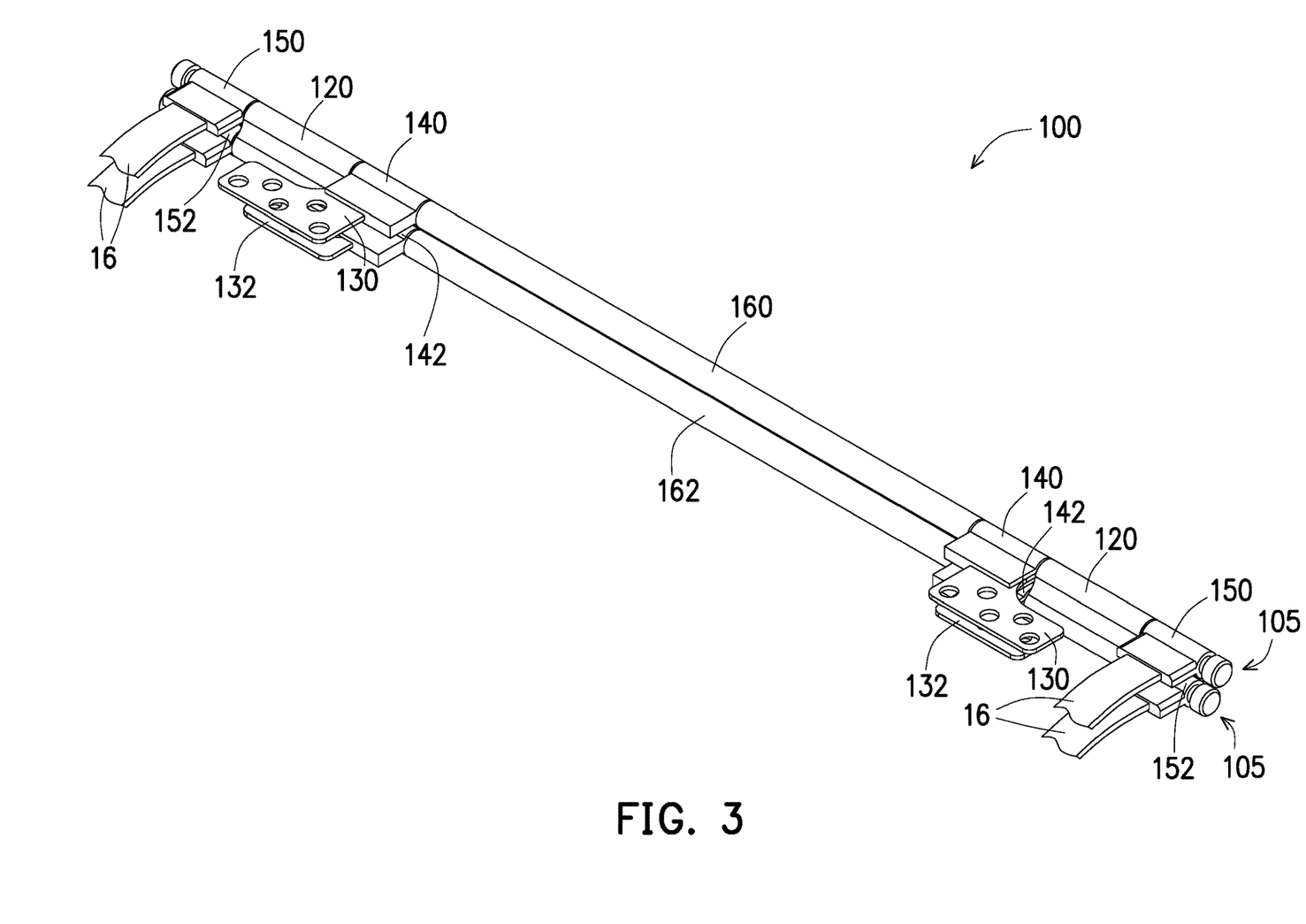
FIG. 3 is a schematic of FIG. 2 from another angle.
Figure 4:
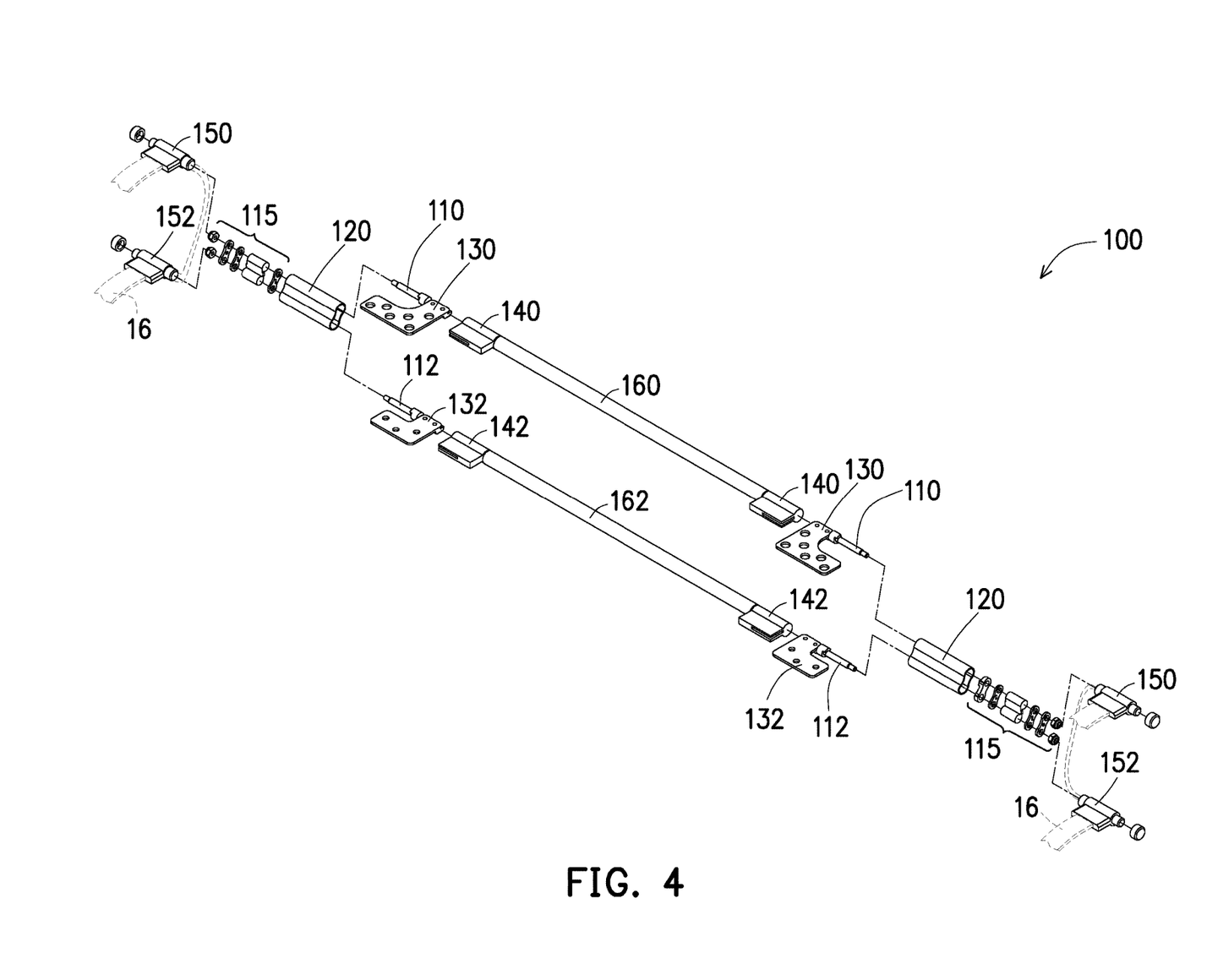
FIG. 4 is an exploded view of FIG. 3.
Figure 5:
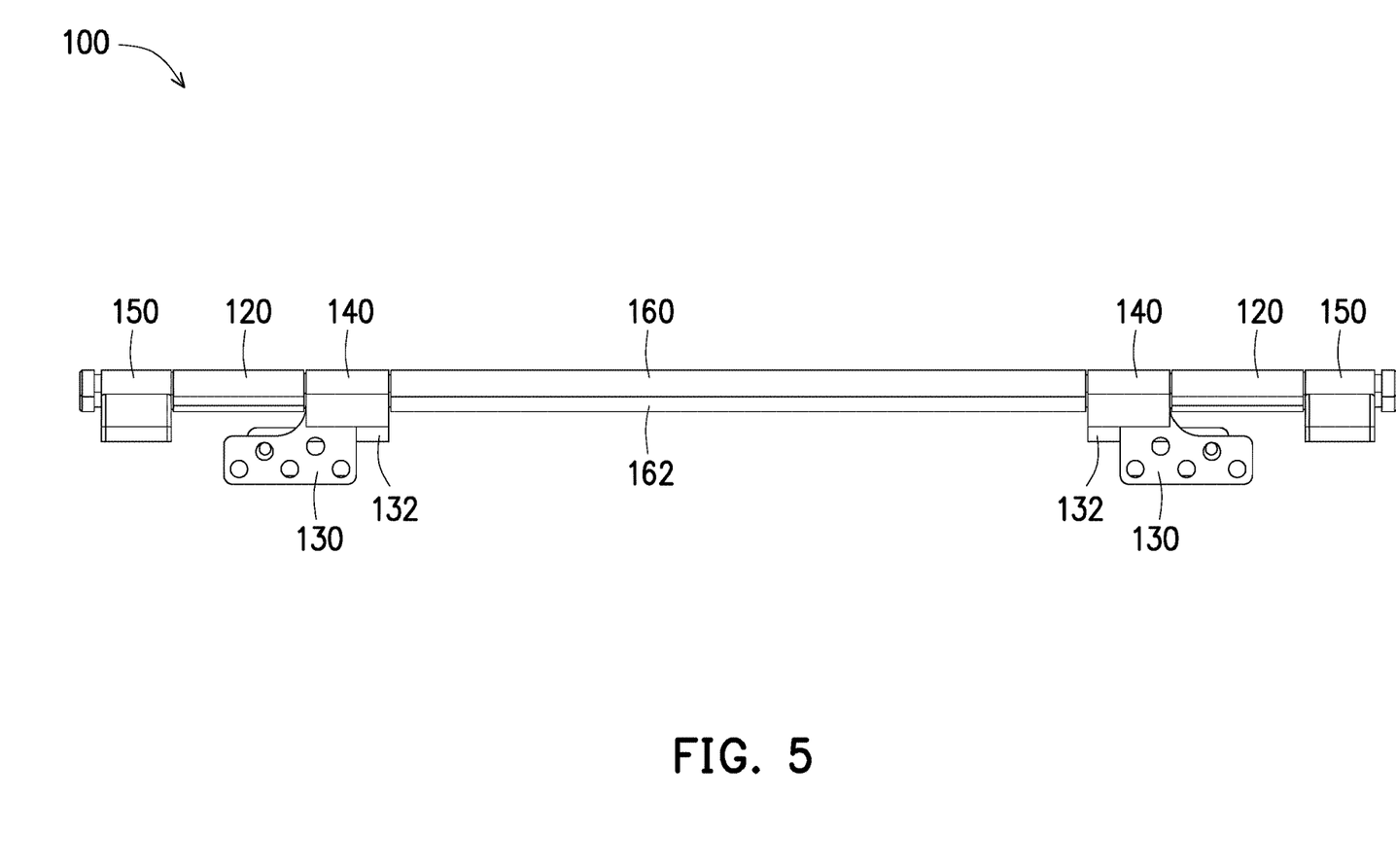
FIG. 5 is a top view of FIG. 2.

The dual-axis hinge assembly 100 is described below. FIG. 2 is a schematic of a dual-axis hinge assembly according to an embodiment of the invention. FIG. 3 is a schematic of FIG. 2 from another angle. FIG. 4 is an exploded view of FIG. 3. FIG. 5 is a top view of FIG. 2.

Referring to FIG. 2 to FIG. 5, the dual-axis hinge assembly 100 includes at least one first rotating shaft 110 (shown in FIG. 4), at least one second rotating shaft 112 (shown in FIG. 4), at least one torque components 115 (shown in FIG. 4), at least one rotating shaft sleeve 120, at least one first bracket 130, at least one second bracket 132, and at least two bracket sleeves 140 and 142. In the present embodiment, the dual-axis hinge assembly 100 may also optionally include at least two cable sleeves 150 and 152, a first rod 160, and a second rod 162. The first rod 160 is coaxial with the first rotating shaft 110 (shown in FIG. 4) and the second rod 162 is coaxial with the second rotating shaft 112 (shown in FIG. 4).

Specifically, as shown in FIG. 4, in the present embodiment, the dual-axis hinge assembly 100 of the present embodiment includes a first rod 160, two bracket sleeves 140 respectively symmetrically located at the left and right sides of the first rod 160, two first brackets 130, two first rotating shafts 110, two rotating shaft sleeves 120, and two cable sleeves 150 to form one of the cylindrical structures 105. The dual-axis hinge assembly 100 further includes a second rod 162, two bracket sleeves 142 respectively symmetrically located at the left and right sides of the second rod 162, two first brackets 132, two first rotating shafts 112, two rotating shaft sleeves 120, and two cable sleeves 152 to form the other of the cylindrical structures 105.

In the present embodiment, the torque components 115 are sleeved on the first rotating shaft 110 and the second rotating shaft 112, and the torque components 115 are configured to provide torque to the first rotating shaft 110 and the second rotating shaft 112. In the present embodiment, the torque components 115 is, for instance, S-shaped and may be sleeved on the first rotating shaft 110 and the second rotating shaft 112 at the same time, but in other embodiments, the torque components 115 may also be two separate component sets, and the type of the torque components 115 are not limited to the figures. It may be seen from FIG. 4 in conjunction with FIG. 3 that, in the present embodiment, the rotating shaft sleeve 120 covers the first rotating shaft 110, the second rotating shaft 112, and the torque components 115. The rotating shaft sleeve 120 is, for example, a figure-eight column that is linked in the middle (or a hollow gourd-shaped column), and may be sleeved on the first rotating shaft 110, the second rotating shaft 112, and the torque components 115 together. In other embodiments, if the torque components 115 are two separate components, the rotating shaft sleeve 120 may also be two separate cylindrical shapes, and the type of the rotating shaft sleeve 120 is not limited to the above.

Returning to FIG. 4, in the present embodiment, the first bracket 130 is fixed to the first rotating shaft 110 and is adapted to be fixed to the first body 12 (shown in FIG. 1). The first bracket 132 is fixed to the second rotating shaft 112 and is adapted to be fixed to the second body 14 (shown in FIG. 1). The first bracket 130 and the second bracket 132 may be fixed to the first body 12 and the second body 14 by, for example, locking, snapping, riveting, etc., and may be moved with the first body 12 and the second body 14. In the present embodiment, the first bracket 130 and the second bracket 132 may be inserted into the corresponding bracket sleeves 140 and 142, such that the bracket sleeves 140 and 142 respectively cover a portion of the first bracket 130 and the second bracket 132. In the present embodiment, the bracket sleeves 140 and 142 are respectively fixed to the first bracket 130 and the second bracket 132, and may be rotated together with the first bracket 130 and the second bracket 132.

As seen in FIG. 3, in the present embodiment, the bracket sleeves 140 and 142 are respectively coaxial with the first rotating shaft 110 and the second rotating shaft 112. Further, in the present embodiment, the bracket sleeve 140 is located between the first rod 160 and the rotating shaft sleeve 120, and the bracket sleeve 142 is located between the second rod 162 and the rotating shaft sleeve 120. The first rod 160 and the bracket sleeve 140 or/and the second rod 162 and the bracket sleeve 142 may be pivotally or fixedly connected in between. That is, there may be relative rotation or may not be relative rotation between the first rod 160 and the bracket sleeve 140 or/and the second rod 162 and the bracket sleeve 142.

In addition, in general, the electronic device 10 (shown in FIG. 1) also includes a cable 16, and the cable 16 is configured to be connected to the first body 12 (shown in FIG. 1) and the second body 14 (shown in FIG. 1) such that the first body 12 is electrically connected to the second body 14. In the present embodiment, the dual-axis hinge assembly 100 utilizes the cable sleeves 150 and 152 to cover the cable 16 to prevent the cable 16 from being exposed. In the present embodiment, the cable sleeves 150 and 152 are respectively coaxial with the first rotating shaft 110 and the second rotating shaft 112. The two cable sleeves 150 and 152 communicate with each other and adapted to allow the cable 16 connected to the first body 12 and the second body 14 to pass through. As a result, the cable 16 between the first body 12 and the second body 14 may be hidden in the cable sleeves 150 and 152 and not be exposed.

In the present embodiment, the dual-axis hinge assembly 100 is sequentially sleeved together by the cable sleeve 150, the rotating shaft sleeve 120, the bracket sleeve 140, the first rod 160, the bracket sleeve 140, the rotating shaft sleeve 120, and the cable sleeve 150 to form one of the cylindrical structures 105, and the cable sleeve 152, the rotating shaft sleeve 120, the bracket sleeve 142, the second rod 162, the bracket sleeve 142, the rotating shaft sleeve 120, and the cable sleeve 152 are sequentially sleeved together to become the other of the cylindrical structures 105. In the process of assembly, the assembly may be completed by simply sleeving the above components together, and the process is relatively simple. After the assembly is completed, the two cylindrical structures 105 are side by side and parallel to each other to achieve an aesthetic appearance.

Figure 6:
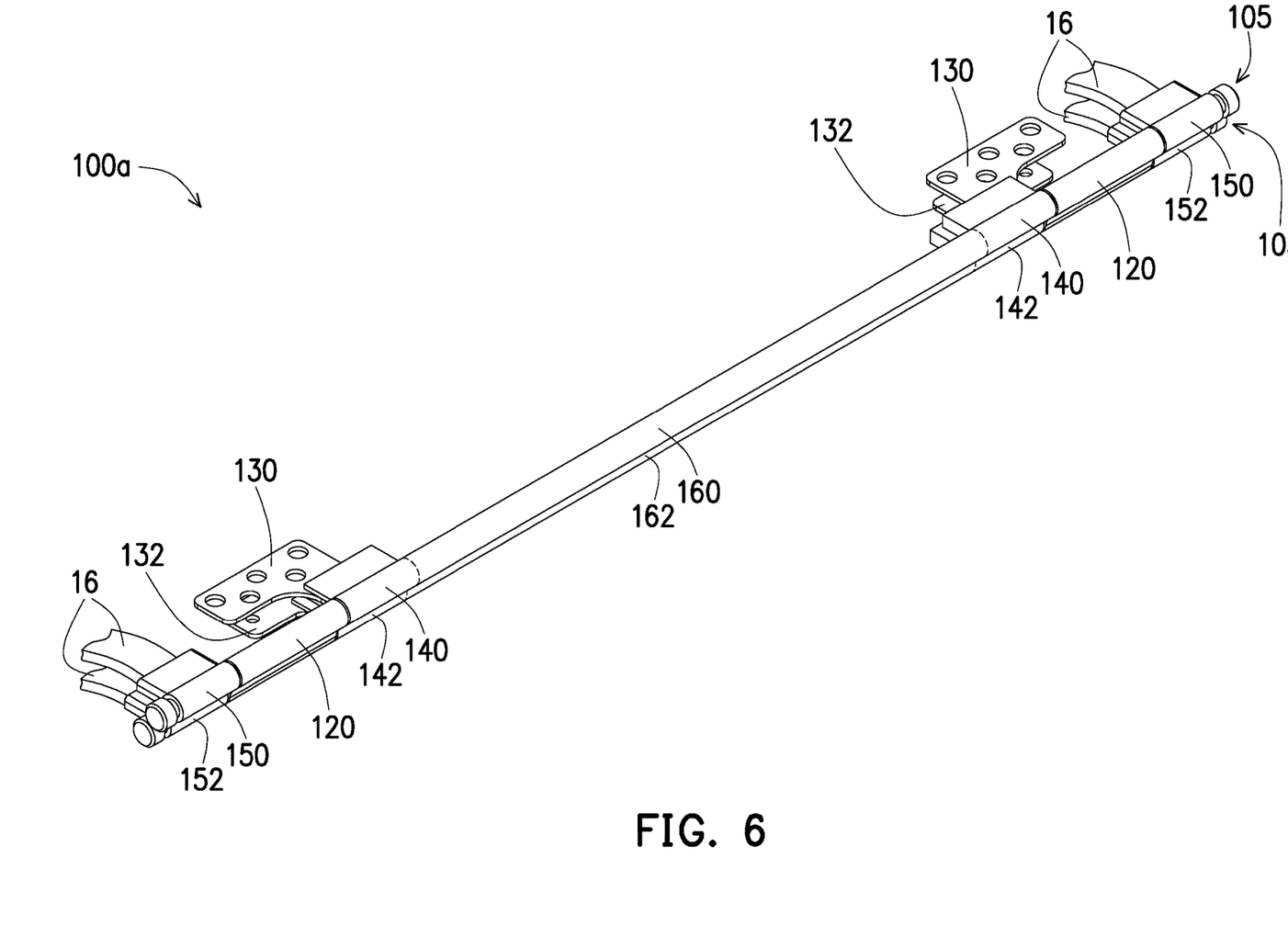
FIG. 6 is a schematic of a dual-axis hinge assembly according to another embodiment of the invention.

FIG. 6 is a schematic of a dual-axis hinge assembly according to another embodiment of the invention. The main difference between a dual-axis hinge assembly 100a of FIG. 6 and the dual-axis hinge assembly 100 of FIG. 2 is that in the dual-axis hinge assembly 100a of the present embodiment, the first rod 160 is integral with the two bracket sleeves 140 at the left and right sides, and the second rod 162 is integral with the two bracket sleeves 142 at the left and right sides. As a result, the dual-axis hinge assembly 100a of the present embodiment may have fewer components and may be assembled more simply.

Figure 7:
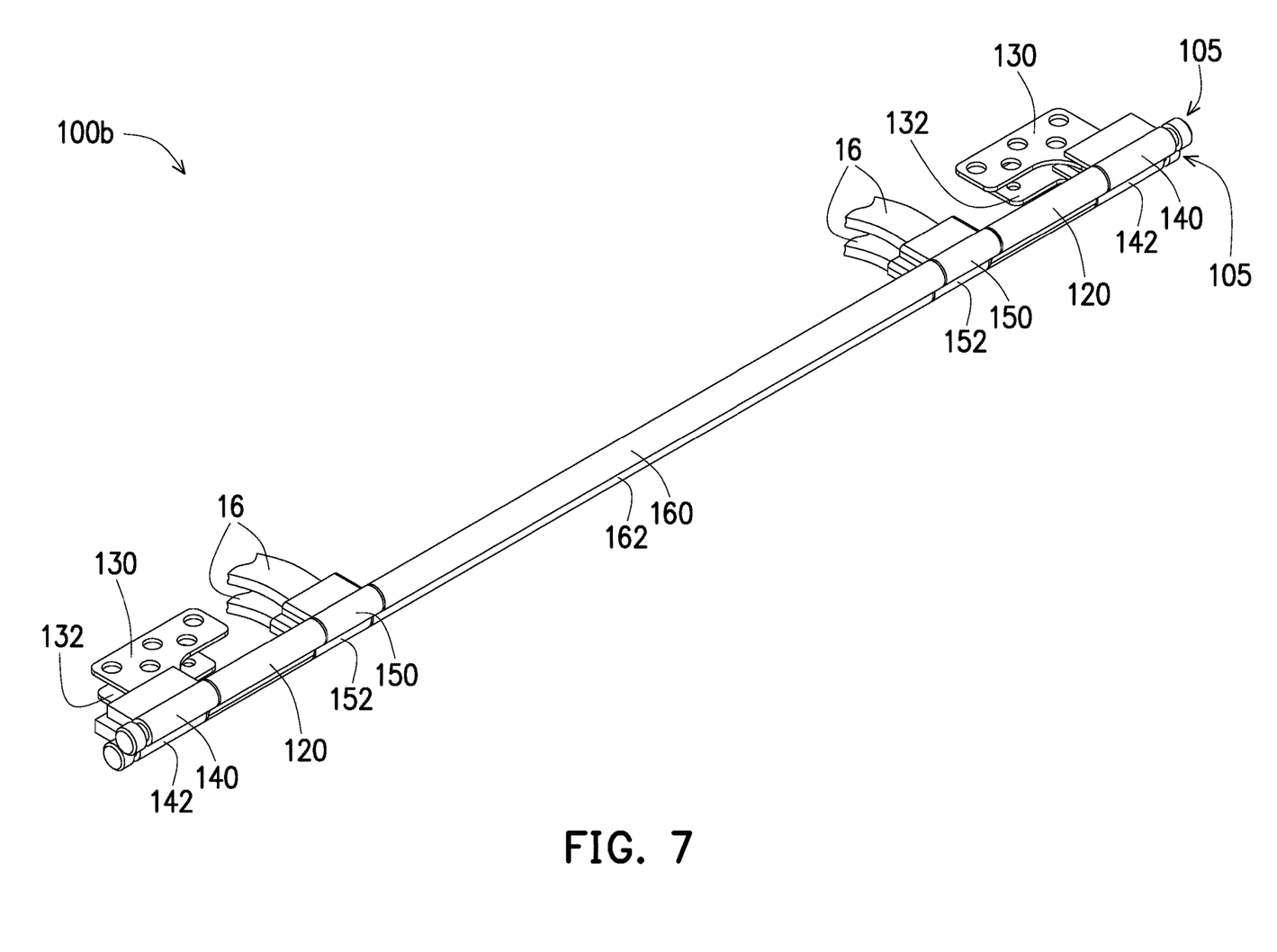
FIG. 7 is a schematic of a dual-axis hinge assembly according to another embodiment of the invention.

FIG. 7 is a schematic of a dual-axis hinge assembly according to another embodiment of the invention. Referring to FIG. 7, the main difference between a dual-axis hinge assembly 100b of FIG. 7 and the dual-axis hinge assembly 100 of FIG. 2 is the order in which the components are arranged. In the dual-axis hinge assembly 100b of the present embodiment, the bracket sleeve 140, the rotating shaft sleeve 120, the cable sleeve 150, the first rod 160, the cable sleeve 150, the rotating shaft sleeve 120, and the bracket sleeve 140 are sequentially sleeved together to form one of the cylindrical structures 105. In addition, the bracket sleeve 142, the rotating shaft sleeve 120, the cable sleeve 152, the second rod 162, the cable sleeve 152, the rotating shaft sleeve 120, and the bracket sleeve 142 are sequentially sleeved together to form the other of the cylindrical structures 105. That is, the order in which the components of the dual-axis hinge assembly are arranged may be adjusted to provide more flexibility in configuration.

Figure 8:
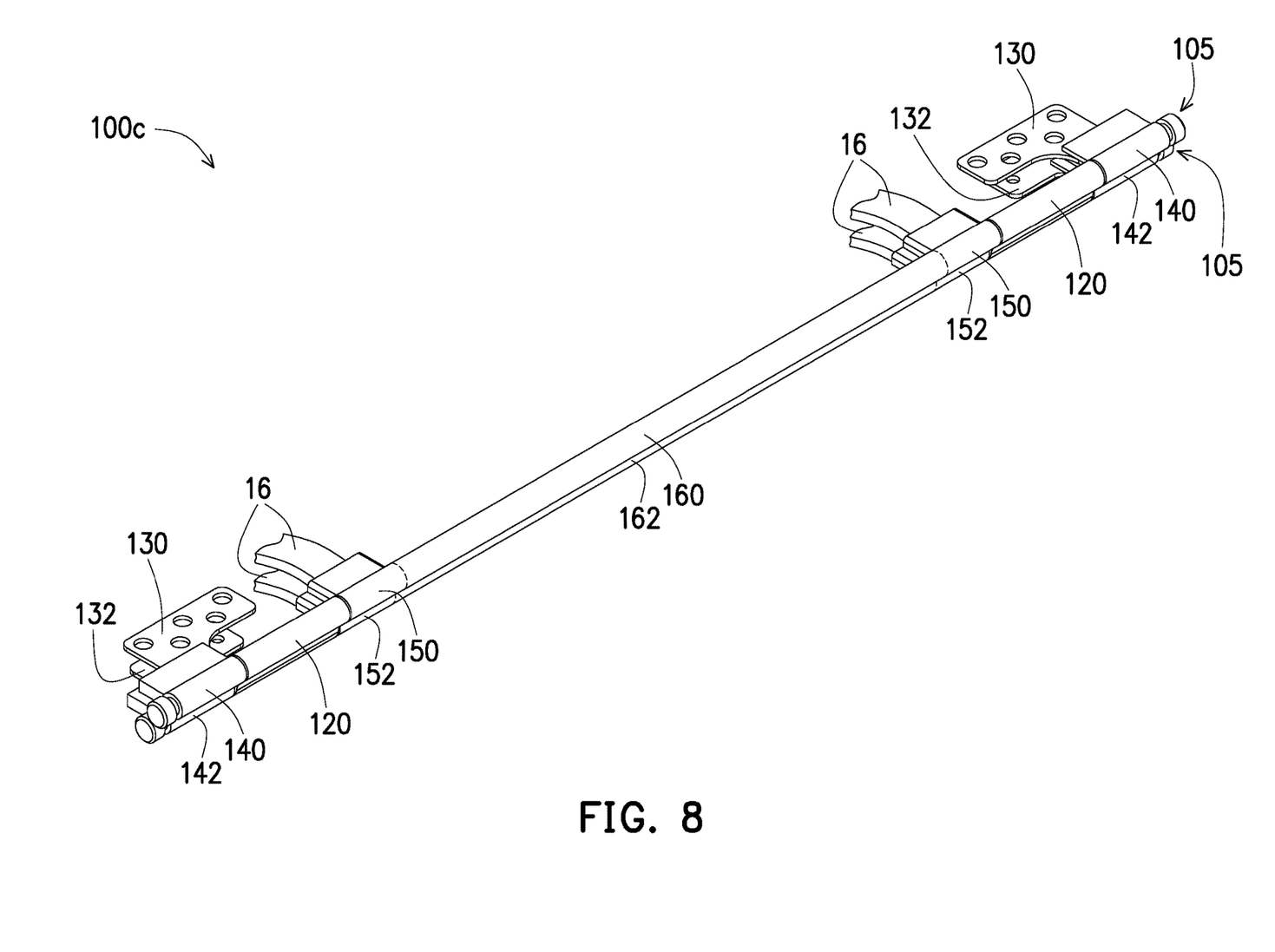
FIG. 8 is a schematic of a dual-axis hinge assembly according to another embodiment of the invention.

FIG. 8 is a schematic of a dual-axis hinge assembly according to another embodiment of the invention. Referring to FIG. 8, the main difference between a dual-axis hinge assembly 100c of FIG. 8 and the dual-axis hinge assembly 100b of FIG. 7 is that, in the present embodiment, the first rod 160 is integral with the two cable sleeves 150 at the left and right sides, and the second rod 162 is integral with the two cable sleeves 152 at the left and right sides. As a result, the dual-axis hinge assembly 100c of the present embodiment may have fewer components and may be assembled more simply.

Figure 9:
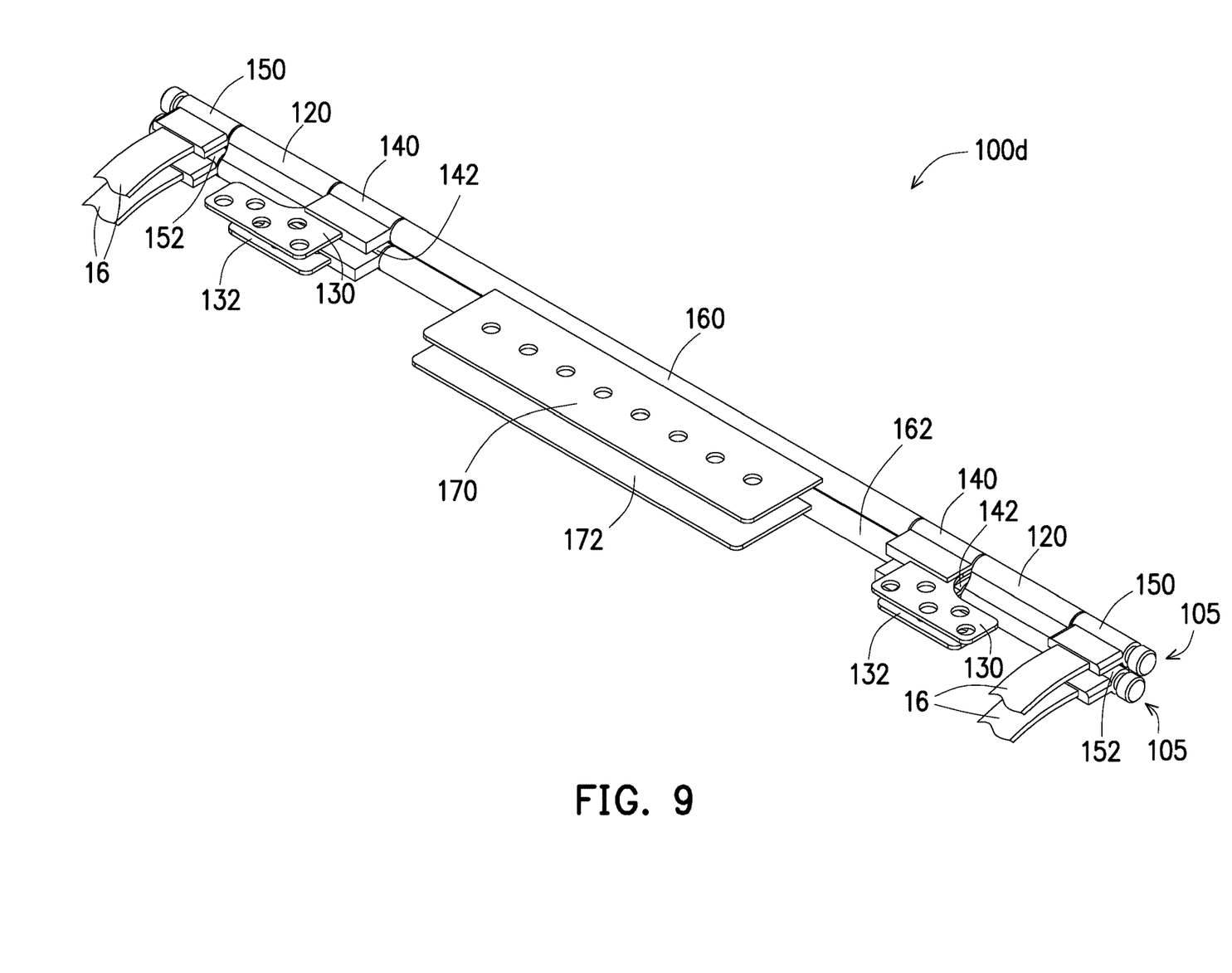
FIG. 9 is a schematic of a dual-axis hinge assembly according to another embodiment of the invention.

FIG. 9 is a schematic of a dual-axis hinge assembly according to another embodiment of the invention. The main difference between a dual-axis hinge assembly 100d of FIG. 9 and the dual-axis hinge assembly 100 of FIG. 3 is that, in the present embodiment, the dual-axis hinge assembly 100d further includes a first connecting portion 170 and a second connecting portion 172. The first connecting portion 170 is extended from the first rod 160 and adapted to be fixed to the first body 12 (shown in FIG. 1). The second connecting portion 172 is extended from the second rod 162 and adapted to be fixed to the second body 14 (shown in FIG. 1). In other words, in the present embodiment, the dual-axis hinge assembly 100d is not only respectively fixed to the first body 12 and the second body 14 via the first bracket 130 and the second bracket 132, but is also fixed to the first body 12 and the second body 14 via the first connecting portion 170 and the second connecting portion 172. As a result, the dual-axis hinge assembly 100d may be more securely fixed to the first body 12 and the second body 14. The method in which the first connecting portion 170 and the second connecting portion 172 is fixed to the first body 12 and the second body 14 may be locking, snapping, riveting, etc., but the method in which the first connecting portion 170 and the second connecting portion 172 are fixed to the first body 12 and the second body 14 is not limited thereto.

Based on the above, the dual-axis hinge assembly of the invention is adapted to pivot the first body 360 degrees to the second body. In addition, the two bracket sleeves, the rotating shaft sleeve, and the two cable sleeves of the dual-axis hinge assembly of the invention are sleeved together to exhibit a more complete appearance. The dual-axis hinge assembly used in the electronic device of the invention is located outside the first body and the second body, the first body and the second body may maintain a complete appearance, and the dual-axis hinge assembly forms two cylindrical structures side by side, thereby providing a unique appearance. In an embodiment, the dual-axis hinge assembly forms one of the cylindrical structures by respectively sleeving the two cable sleeves, the two rotating shaft sleeves, and the two bracket sleeves at two sides of the first rod and forms the other of the cylindrical structures by respectively sleeving the two cable sleeves, the two rotating shaft sleeves, and the two bracket sleeves at two sides of the second rod. The length of the two cylindrical structures may be the same as the length of the first body or/and the second body, such that the overall appearance of the electronic device is aesthetic. In an embodiment, the component adjacent to the first rod (e.g., the bracket sleeve or the two cable sleeves) may be integral with the first rod and the component adjacent to the second rod (e.g., the bracket sleeve or the two cable sleeves) may be integral with the second rod, such that the number of components may be reduced and assembly efficiency may be improved. In an embodiment, the dual-axis hinge assembly may further include a first connecting portion and a second connecting portion extended from the first rod and the second rod, such that the dual-axis hinge assembly may be more securely fixed to the first body and the second body.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A dual-axis hinge assembly adapted to pivot a first body to a second body, wherein both axes of the dual-axis hinge assembly are exposed from the first body and the second body, the dual-axis hinge assembly comprising:
  a first rotating shaft;
  a second rotating shaft disposed side-by-side to the first rotating shaft;
  torque components disposed at the first rotating shaft and the second rotating shaft;
  a rotating shaft sleeve covering the first rotating shaft, the second rotating shaft, and the torque components;
  a first bracket connected to the first rotating shaft and adapted to be fixed to the first body;

a second bracket connected to the second rotating shaft and adapted to be fixed to the second body;

two bracket sleeves, each of the two bracket sleeves having a slot and a hollow portion, the hollow portions respectively coaxial with the first rotating shaft and the second rotating shaft and respectively covering a first portion of the first bracket and a first portion of the second bracket, the slots respectively covering a second portion of the first bracket and a second portion of the second bracket, wherein the two hollow portions and the rotating shaft sleeve are connected to the ends of each other, and the two bracket sleeves are adapted to rotate relative to the rotating shaft sleeve;

a first rod coaxial with the first rotating shaft; and a second rod coaxial with the second rotating shaft, wherein the first rod and the second rod are pivotally connected to the rotating shaft sleeve or respectively pivotally connected to the two bracket sleeves.

2. The dual-axis hinge assembly of claim 1, further comprising:

a cable adapted to connect to the first body and the second body; and two cable sleeves respectively coaxial with the first rotating shaft and the second rotating shaft, wherein the two cable sleeves are hollow and the hollow areas are open to each other, and the two cable sleeves are attached to each other and adapted to allow the cable connected to the first body and the second body to pass through, wherein the rotating shaft sleeve and the two cable sleeves are connected to the ends of each other.

3. The dual-axis hinge assembly of claim 1, wherein the first rod is integral with one of the cable sleeves, and the second rod is integral with the other of the cable sleeves.

4. The dual-axis hinge assembly of claim 1, further comprising:

a first connecting portion extended from the first rod and adapted to be fixed to the first body; and a second connecting portion extended from the second rod and adapted to be fixed to the second body.

5. An electronic device, comprising:

a first body;

a second body; and a dual-axis hinge assembly connected to the first body and the second body, wherein both axes of the dual-axis hinge assembly are exposed from the first body and the second body, the dual-axis hinge assembly comprising:

a first rotating shaft;

a second rotating shaft disposed side-by-side to the first rotating shaft;

torque components disposed at the first rotating shaft and the second rotating shaft;

a rotating shaft sleeve covering the first rotating shaft, the second rotating shaft, and the torque components;

a first bracket connected to the first rotating shaft and fixed to the first body;

a second bracket connected to the second rotating shaft and fixed to the second body;

two bracket sleeves, each of the two bracket sleeves having a slot and a hollow portion, the hollow portions respectively coaxial with the first rotating shaft and the second rotating shaft and respectively covering a first portion of the first bracket and a first portion of the second bracket, the slots respectively covering a second portion of the first bracket and a second portion of the second bracket, wherein the two hollow portions and the rotating shaft sleeve are connected to the ends of each other, and the two bracket sleeves are adapted to rotate relative to the rotating shaft sleeve;

a first rod coaxial with the first rotating shaft; and a second rod coaxial with the second rotating shaft, wherein the first rod and the second rod are pivotally connected to the rotating shaft sleeve or respectively pivotally connected to the two bracket sleeves.

6. The electronic device of claim 5, wherein the dual-axis hinge assembly further comprises:

a cable connected to the first body and the second body; and two cable sleeves respectively coaxial with the first rotating shaft and the second rotating shaft, wherein the two cable sleeves are hollow and the hollow areas are open to each other, and the two cable sleeves are attached to each other and adapted to allow the cable connected to the first body and the second body to pass through, wherein the rotating shaft sleeve and the two cable sleeves are connected to the ends of each other.

7. The electronic device of claim 5, wherein the first rotating shaft and the second rotating shaft, the torque components, the rotating shaft sleeve, at least a portion of each of the bracket sleeves, at least a portion of each of the cable sleeves, and the first rod and the second rod are located outside the first body and the second body.

8. The electronic device of claim 5, wherein the first rod is integral with one of the cable sleeves, and the second rod is integral with the other of the cable sleeves.

9. The electronic device of claim 5, wherein the dual-axis hinge assembly further comprises:

a first connecting portion extended from the first rod and fixed to the first body; and a second connecting portion extended from the second rod and fixed to the second body.

10. An electronic device, comprising:

a first body;

a second body;

a dual-axis hinge assembly disposed at the first body and the second body, so that the first body is pivoted to the second body, wherein both axes of the dual-axis hinge assembly are exposed from the first body and the second body; and a cable connected to the first body and the second body, wherein the dual-axis hinge assembly comprises:

a first rotating shaft;

a second rotating shaft disposed side-by-side to the first rotating shaft;

torque components are disposed on the first rotating shaft and the second rotating shaft;

a rotating shaft sleeve covering the first rotating shaft, the second rotating shaft, and the torque components;

a first bracket fixed to the first rotating shaft and fixed to the first body;

a second bracket fixed to the second rotating shaft and fixed to the second body;

two bracket sleeves, each of the two bracket sleeves having a slot and a hollow portion, the hollow portions respectively coaxial with the first rotating shaft and the second rotating shaft and respectively covering a first portion of the first bracket and a first portion of the second bracket, the slots respectively covering a second portion of the first bracket and a second portion of the second bracket;

two cable sleeves respectively coaxial with the first rotating shaft and the second rotating shaft, wherein the two cable sleeves are hollow and the hollow areas are open to each other, and the two cable sleeves are attached to each other, and the cable passes through the two cable sleeves, wherein the rotating shaft sleeve and the two cable sleeves are connected to the ends of each other;

a first rod coaxial with the first rotating shaft; and a second rod coaxial with the second rotating shaft, wherein the first rod and the second rod are respectively pivotally connected to the two bracket sleeves or respectively pivotally connected to the two cable sleeves and exposed from the first body and the second body.

11. The electronic device of claim 10, wherein the dual-axis hinge assembly further comprises:

a first connecting portion extended from the first rod and fixed to the first body; and a second connecting portion extended from the second rod and fixed to the second body.

* * * * *